(12) United States Patent
Snibbe et al.

(10) Patent No.: US 7,143,357 B1
(45) Date of Patent: Nov. 28, 2006

(54) SYSTEM AND METHODS FOR COLLABORATIVE DIGITAL MEDIA DEVELOPMENT

(75) Inventors: Scott S. Snibbe, San Francisco, CA (US); Baldo Faieta, San Francisco, CA (US); William L. Verplank, Menlo Park, CA (US); Cy de Groat, San Francisco, CA (US); Lukas Girling, Nottingham (GB); Annarosa Tomasi, Menlo Park, CA (US)

(73) Assignee: Vulcan Portals, Inc., Seattle, WA (US)

( * ) Notice: Subject to any disclaimer, the term of this patent is extended or adjusted under 35 U.S.C. 154(b) by 389 days.

(21) Appl. No.: 09/828,491

(22) Filed: Apr. 4, 2001

Related U.S. Application Data

(60) Provisional application No. 60/205,608, filed on May 18, 2000, provisional application No. 60/263,398, filed on Jan. 22, 2001.

(51) Int. Cl.
*G06F 3/00* (2006.01)
*G06F 15/16* (2006.01)

(52) U.S. Cl. ...................... 715/751; 709/204
(58) Field of Classification Search ................ 345/749, 345/750, 751, 752, 753, 758; 709/200, 204; 715/751
See application file for complete search history.

(56) References Cited

U.S. PATENT DOCUMENTS

| | | | |
|---|---|---|---|
| 5,617,539 A * | 4/1997 | Ludwig et al. ............. 709/205 |
| 6,438,579 B1 * | 8/2002 | Hosken ....................... 709/203 |
| 6,507,865 B1 * | 1/2003 | Hanson et al. .............. 709/206 |
| 6,515,681 B1 * | 2/2003 | Knight ........................ 345/751 |
| 6,614,451 B1 * | 9/2003 | Hudson et al. ............. 345/759 |

OTHER PUBLICATIONS

Fielding, Ray T. and Kaiser, Gail. "Collaborative Work: The Apache HTTP server Project". IEEE Internet Computing. http://computer.org/internet/. Jul.Aug. 1997. pp. 88-90. URL:(http://hackvan.com/pub/stig/articles/apache-server-project.pdf).*

Lynch, Jim, "AIM (A Little) Higher", Oct. 19, 1999, PC Magazine, vol. 18, Issue 18, p49.*

* cited by examiner

*Primary Examiner*—Kieu D. Vu
*Assistant Examiner*—Ting Zhou
(74) *Attorney, Agent, or Firm*—Van Pelt, Yi & James LLP

(57) ABSTRACT

Collaborative digital media artifact production is disclosed. Included are structured collaborative digital media creation environments intended to enable communities to create full and partial digital media products. Activities such as creating individual identities, browsing identities of other users, creating and viewing digital media artifacts, tracking the development history of a digital media artifact, voting on, rating, and modifying digital media products developed by other users are included. A collaborative digital media creation system is also included for digital media artifact production, including a studio having interfaces for user interaction for community development.

24 Claims, 15 Drawing Sheets

SYSTEM AND METHODS FOR COLLABORATIVE DIGITAL MEDIA DEVELOPMENT

CROSS REFERENCE TO RELATED APPLICATIONS

This application claims priority to Provisional U.S. Patent Application No. 60/205,608 filed May 18, 2000 entitled, ONLINE COLLABORATIVE MEDIA FRAMEWORK, and to Provisional U.S. Patent Application No. 60/263,398 filed Jan. 22, 2001 entitled, COLLABORATIVE DIGITAL MEDIA DEVELOPMENT TOOLS, the disclosures of which are incorporated by reference herein in their entirety.

BACKGROUND OF THE INVENTION

The present invention relates to the creation of digital media in a computer network environment. In particular, the invention relates to systems and methods for collaborative digital media development.

Media artifacts (television programs, films, songs, animations, etc.) are typically created by a single or a very few creative minds and delivered to a mass audience. A general audience's ability to consume and produce such media is highly asymmetrical, in that they are most often consume dynamic media, yet rarely author in these media. Currently, there are few systems or tools for people to create media with anything approaching the ease with which it is consumed.

There is a known demand from media producers to create media that is informed by the audience. From the producer's point of view, this will result in reduced risk in producing popular content, since an audience's vested interest is pre-assured. Furthermore, media companies wish to have audience members interact with their show's characters and content while not watching the show as a means to build loyalty and "mindshare." Advertising and product companies similarly have the need and desire for consumers to interact with their brand and the advertising content when they are not consuming a product or watching their ad.

Finally, media and advertising companies have the need to link their computer network-based entertainment with the traditional media entertainment, ideally driving audience continuously from one activity to another. Targeting consumers in both places increases the value and specificity of advertising and promotion targeted to these consumers. Overall, such a connection increases the time and mindshare for the media, brand and advertising companies.

Thus, improved digital media creation and production tools that address these issues are needed.

SUMMARY OF THE INVENTION

The present invention addresses the above problems by providing tools for collaboration in producing a digital media artifact. These tools of the invention include a variety of systems and methods that support creativity, including, in particular, a structured collaborative digital media creation environment. The present invention may be applied to enable communities to create full and partial digital media products. Systems and methods of embodiments of the present invention may provide a forum for individuals to compete and collaborate within a collaborative community to transform their ideas into a media product. Users may participate in a complete set of activities which includes: creating an individual identity, browsing through the identities of other users, creating and viewing stories or other media artifacts, tracking the history of the development of a media artifact, voting on (rating) and/or modifying other community members' work.

Some embodiments of the invention may be implemented as a deadline-driven collaborative creation environment. At the end of the deadline period, producers wholly or partially from within or without the collaborative community, for example professional media creators (animators, writers, directors, musicians), may use the community's contributions to construct a professional media product. Alternatively, producers may produce a final product from the community's collaborative contributions independent of a deadline. The final product from these collaborative media development projects may be presented online or aired on offline media (i.e., television).

In one aspect, the invention pertains to a computer-implemented method of developing digital media content. The method involves providing a user interface to a digital device network, the interface configured to enable a user to contribute collaboratively online with other users in a collaborative community to create a digital media artifact. A deadline may be established for user contributions to the online digital media artifact, and the collaborative user contributions to the online digital media artifact may be submitted for production by a third party, within or outside of the collaborative community, into a final media product. Alternatively, a subset of the collaborative contributions to the media artifact may be selected and combined into a final media product.

In another aspect, the invention pertains to a computer-implemented method of developing digital media content. This alternative method involves providing a user interface to a digital device network, the interface configured to enable a user to contribute collaboratively online with other users to the creation of a plurality of digital media artifacts. A deadline may be established for user contributions to the online digital media artifacts, and the collaborative user contributions to each of the online digital media artifacts prior to the deadline may be assembled into a final media product.

In yet another aspect, the invention pertains to a computer-supported system for developing digital media content. The system includes a network of digital devices configured to run software providing a user interface to the digital computer network. The interface is configured to enable a user to contribute collaboratively online with other users to create a digital media artifact. The system may further include a media production capability, wherein the system is operated to submit collaborative user contributions made to the online digital media artifact prior to an established deadline for production into a final media product.

Another aspect of the invention pertains to computer program products including a machine readable medium on which is stored program instructions for implementing any of the methods described above. Any of the methods of this invention may be represented as program instructions that can be provided on such computer readable media.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Figure 1:
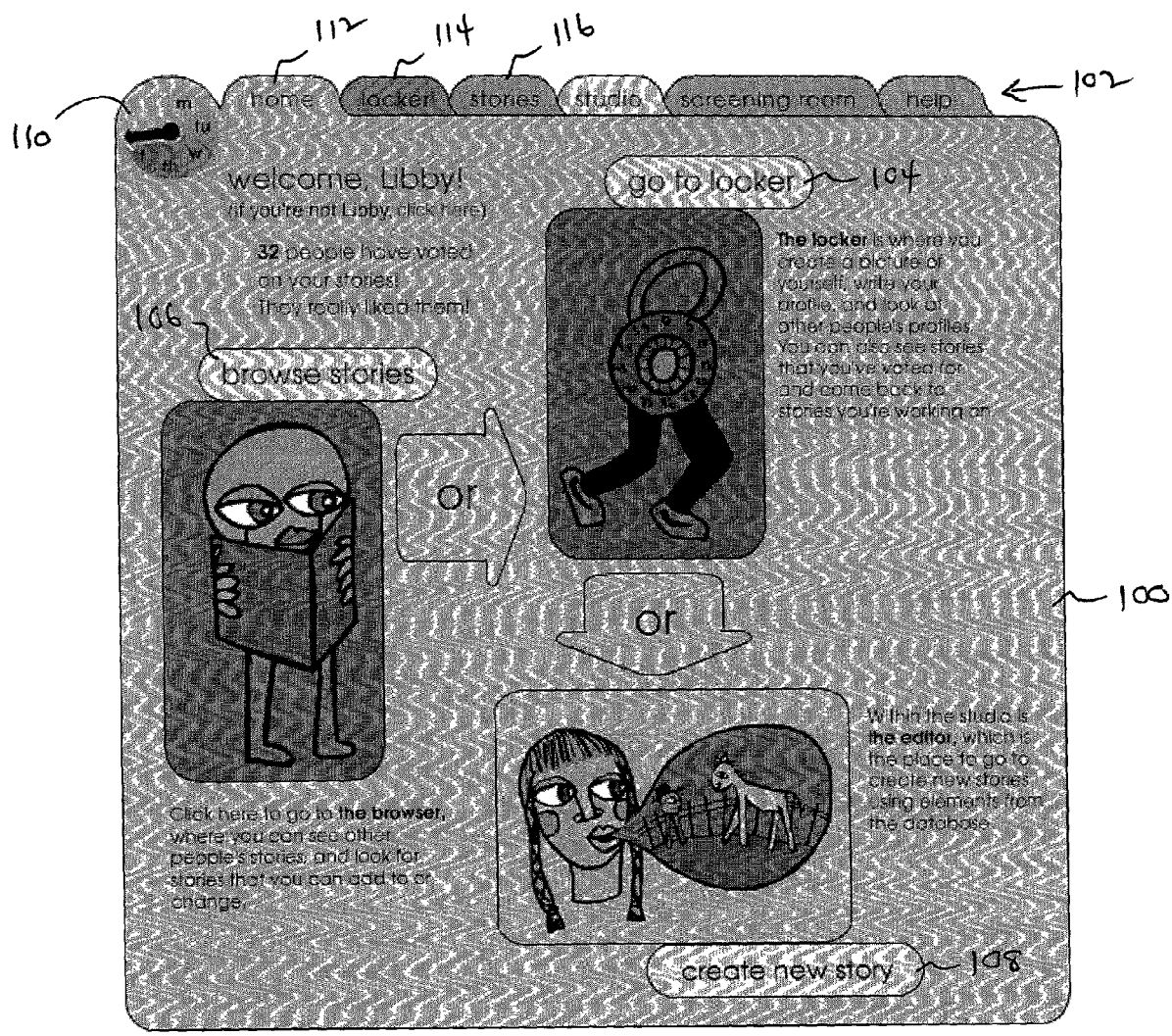
FIG. 1 depicts a screen shot of a home page for a collaborative digital media development system website in accordance with one embodiment of the present invention.

Reference will now be made in detail to some specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides tools for collaboration in producing a digital media artifact. These tools of the invention include a variety of systems and methods that support creativity, including, in particular, a structured collaborative digital media creation environment. The present invention may be applied to enable communities to create full and partial digital media products. Systems and methods of embodiments of the present invention may provide a forum for individuals to compete and collaborate within a collaborative community to transform their ideas into a media product. Users may participate in a complete set of activities which includes: creating an individual identity, browsing through the identities of other users, creating and viewing stories or other media artifacts, tracking the history of the development of a media artifact, voting on (rating) and/or modifying other community members' work.

Some embodiments of the invention may be implemented as a deadline-driven collaborative creation environment. At the end of the deadline period, producers wholly or partially from within or without the collaborative community, for example professional media creators (animators, writers, directors, musicians), may use the community's contributions to construct a professional media product. Alternatively, producers may produce a final product from the community's collaborative contributions independent of a deadline. The final product from these collaborative media development projects may be presented online or aired via traditional media (i.e., television, radio, film, home video, etc.).

Technical implementation of the systems and methods of the present invention may be achieved using a variety of different existing hardware and software tools as will be apparent to one of skill in the art upon reading the present disclosure. Technical implementation details are provided herein only to the extent necessary to enable one of skill in the art to practice the invention.

The present invention provides several features, some or all of which may be integrated into methods and systems for developing digital media content. These features are described below with reference to the accompanying figures and non-limiting examples.

A preferred embodiment of the present invention will now be described with reference to several screen shots depicted in the figures. In this embodiment, a system is provided which allows individuals to compete and collaborate to transform their ideas into a professional media product within a deadline-driven community. The system includes an integrated online framework that implements a collaborative community on a website.

Home

FIG. 1 depicts a home page 100 for a collaborative digital media development system website in accordance with the present invention. In this specific embodiment, the website is organized in a manner analogous to a paper filing system in which folders relating to a particular category of features of the system contain documents relating to specific features in that category. The home page 100 provides an entry point for users to the system. A series of tabs 102, 112–116 along the top of the page 100 are available to users who may select a tab 102, 112–116 (for example, by clicking with a mouse, pointer, or other graphical user interface cursor controller such as are well known in the art) to access certain features of the system, described in detail below. These tabs 102, 112–116 are visible and available to the user in all pages of the system website. In addition, the home page 100 includes selectable buttons for three main user activities of the system—visiting a user's personalized home page, the locker ("go to locker" button 104); browsing stories ("browse stories" button 106); and creating stories ("create new story" button 108). Selecting one of these buttons retrieves a corresponding web page.

Figure 2A:
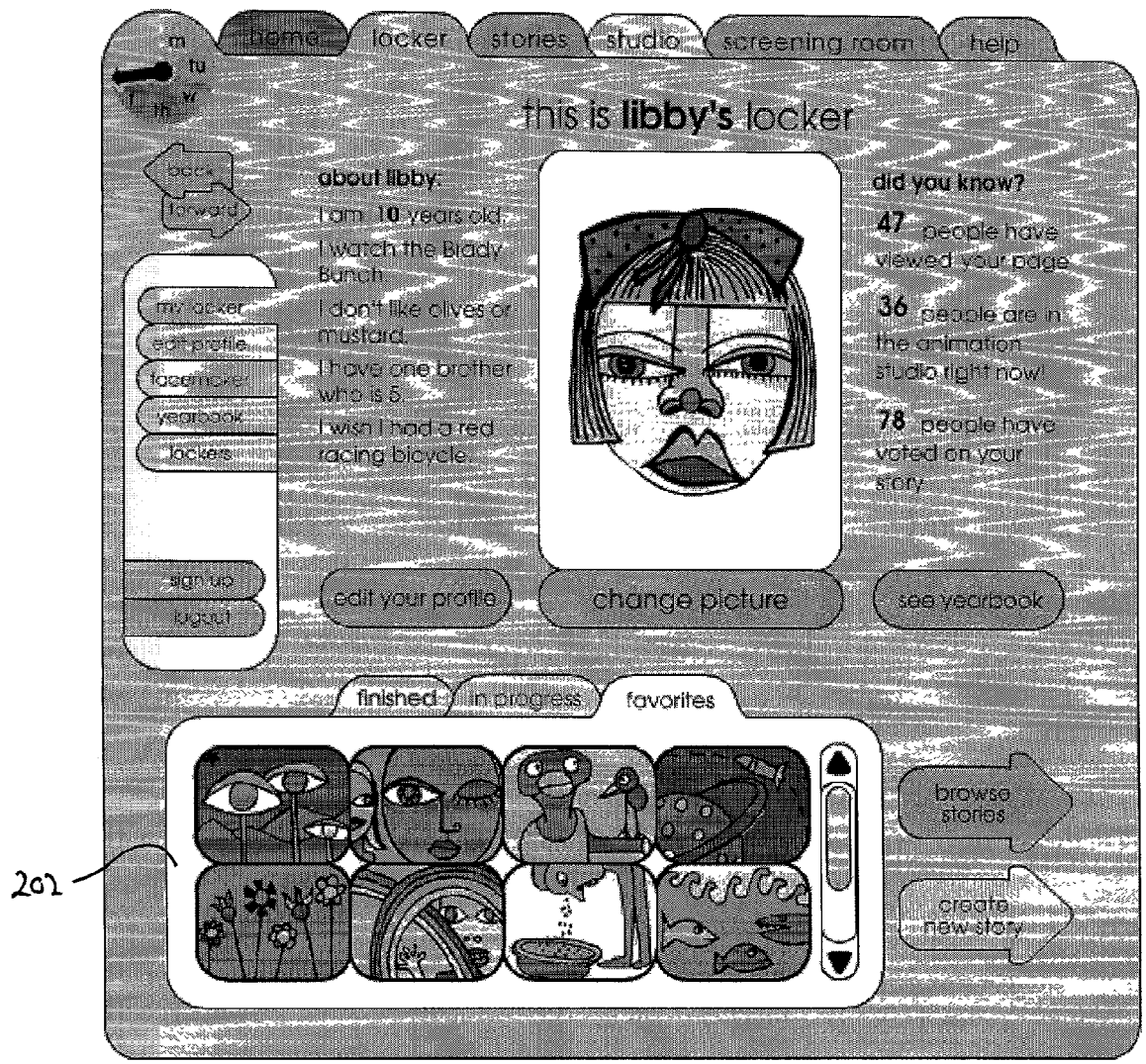
FIG. 2A depicts a screen shot of a main locker page for a collaborative digital media development system website in accordance with one embodiment of the present invention.

The main locker page, as depicted in FIG. 2A, is accessed by selecting the "go to locker" button. The locker may also be accessed by selecting the "locker" tab along the top of the home page. As described further below with reference to FIGS. 2A–4, the locker has a graphical interface enabling a user to create an identity to represent the user in the collaborative creative community supported by the system. For example, the locker provides tools for a user to create, via an electronic collage technique, a picture to represent the user, and a user profile. The locker provides a number of other features, described below with reference to FIGS. 2A–4.

Figure 5A:
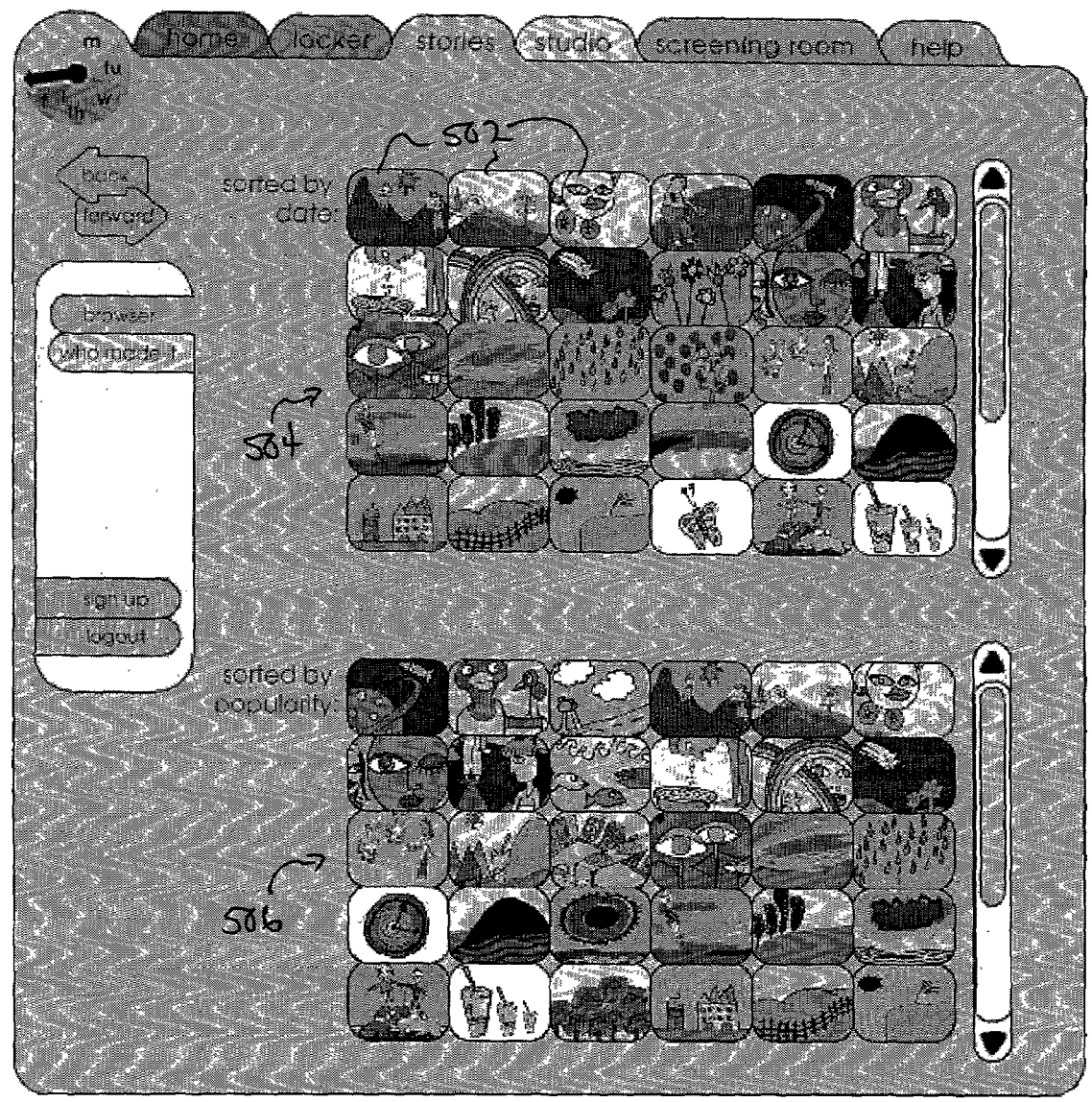
FIG. 5A depicts a screen shot of a main stories page in a collaborative digital media development system website in accordance with one embodiment of the present invention, which may be retrieved by selecting the "browse stories" button in the home (FIG. 1) or main locker (FIG. 2A) pages or the "stories" tab along the top of any page.

Selecting the "browse stories" button retrieves the main stories page, as depicted in FIG. 5A. The main stories page may also be accessed by selecting the "stories" tab along the top of the home page. As described further below with reference to FIGS. 5A–6, the stories pages include a graphical interface enabling a user to browse through stories created by members of the collaborative creative community supported by the system, for instance, to look for stories that the user is interested in adding to or modifying, and to track a story's creation history. The stories pages provide a number of other features, described below with reference to FIGS. 5A–6.

Figure 7:
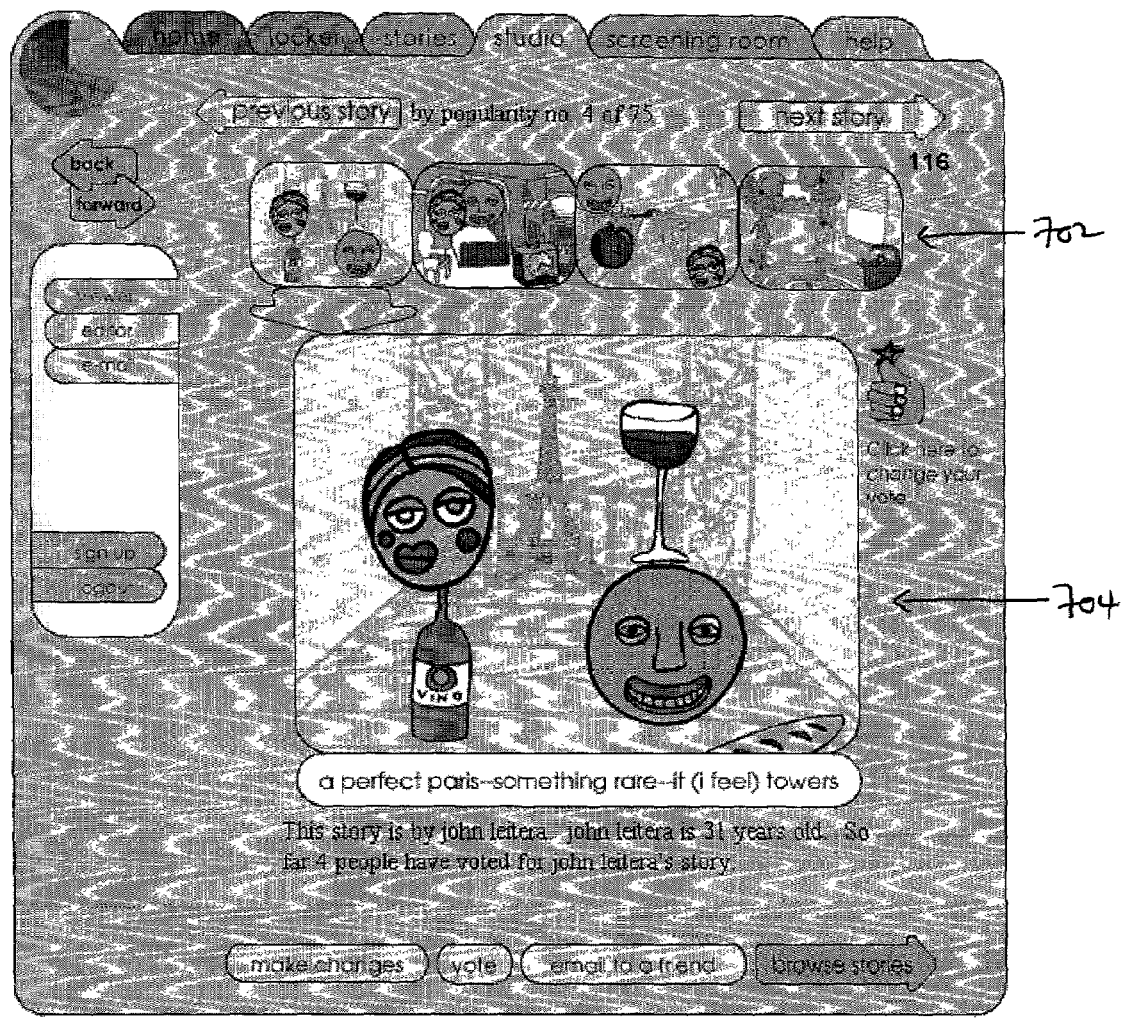
FIG. 7 depicts a screen shot of a story viewer page in a collaborative digital media development system website in accordance with one embodiment of the present invention, which allows a user to view a selected story in detail.
Figure 8:
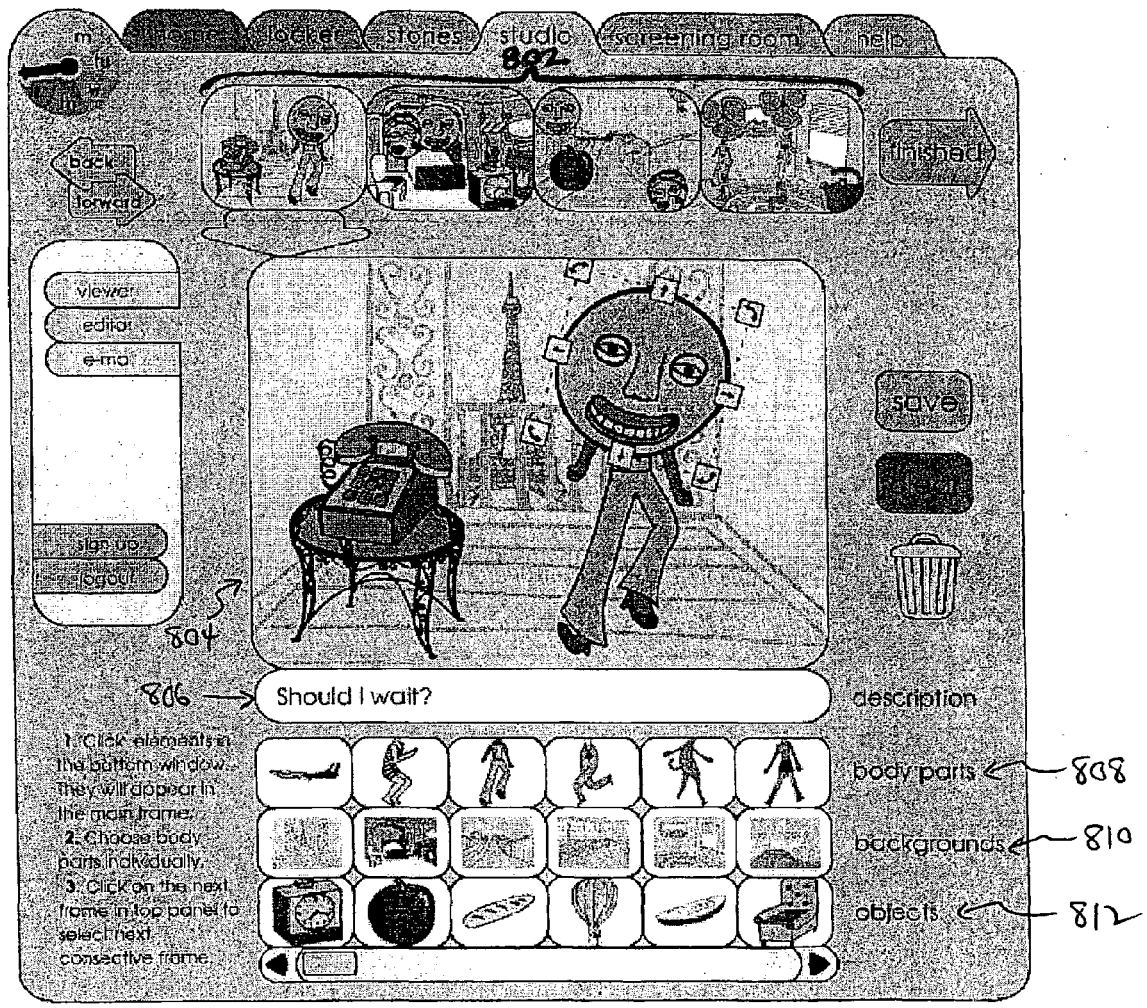
FIG. 8 depicts a screen shot of an "editor" page in a collaborative digital media development system website in accordance with one embodiment of the present invention, which allows a user to create or modify a selected story.

Selecting the "create new story" button retrieves the studio (editor) page, as depicted in FIG. 8. This page may also be accessed by selecting the "studio" tab along the top of the home page and then selecting the "editor" button, as described in more detail with reference to FIGS. 7 and 8. As described further below with reference to FIGS. 7 and 8, the studio has a graphical interface enabling a user to create new stories, or to modify stories created by members of the collaborative creative community supported by the system, using elements from a database. The studio provides a number of other features, described below with reference to FIGS. 7 and 8.

The home page 100 of FIG. 1 also includes two additional features in the upper left corner. A clock image 110 displays the amount of time remaining before expiration of a deadline for contribution to be made to a collaborative creation (media artifact) before the artifact is reviewed by a producer to produce a final media product. This process is described further below with reference to FIG. 9. In this instance, the home page 100 also includes a region to the lower left of the clock to display a greeting to ensure that the community member has logged on correctly and to provide information relating to the status of and community activity relating to the user's creations.

Locker

FIG. 2A depicts the main locker page for the collaborative digital media development system website. The locker provides an area for users to keep track of their site activities. It also shows statistics on how an individual's work is being viewed and voted upon by the community. The locker has private and public parts. The private parts of the locker are reserved for the user's personal work-in-progress. The public parts of the locker can be visited by others in the community and provide a mechanism for users to display their work to community members.

Access to the locker's features is obtained by selecting one of the tabs or buttons in the main locker page. In the main page, the user's picture and profile are displayed (in this case, in the upper middle of the page) together with information relating to the status of and community activity relating to the user's creations. On the left side of the page are a series of tabs relating to features of the locker. In the main page, the "my locker" tab on the left side of the page is selected. The main navigation tabs are displayed at the top of the page. By selecting one of these tabs a user may retrieve its associated page. The clock is also depicted in the upper left corner, as discussed above, as are "back" and "forward" browser control buttons.

At the bottom of the page is a window 202 with some associated tabs. By selecting one of these tabs, the user may view stories in the window that they have voted on and identified as their favorites ("favorite stories;" selected in FIG. 2A), stories that have been completed ("finished"), or stories that are still being worked on ("in progress"). These stories can be viewed in the "story" section or within a popup window. Adjacent to the window are "browse stories" and "create new story" buttons that may be selected to directly access the main stories page, as depicted in FIG. 5A, and the studio (editor) page, as depicted in FIG. 8, respectively, as described above with reference to FIG. 1.

Figure 2B:
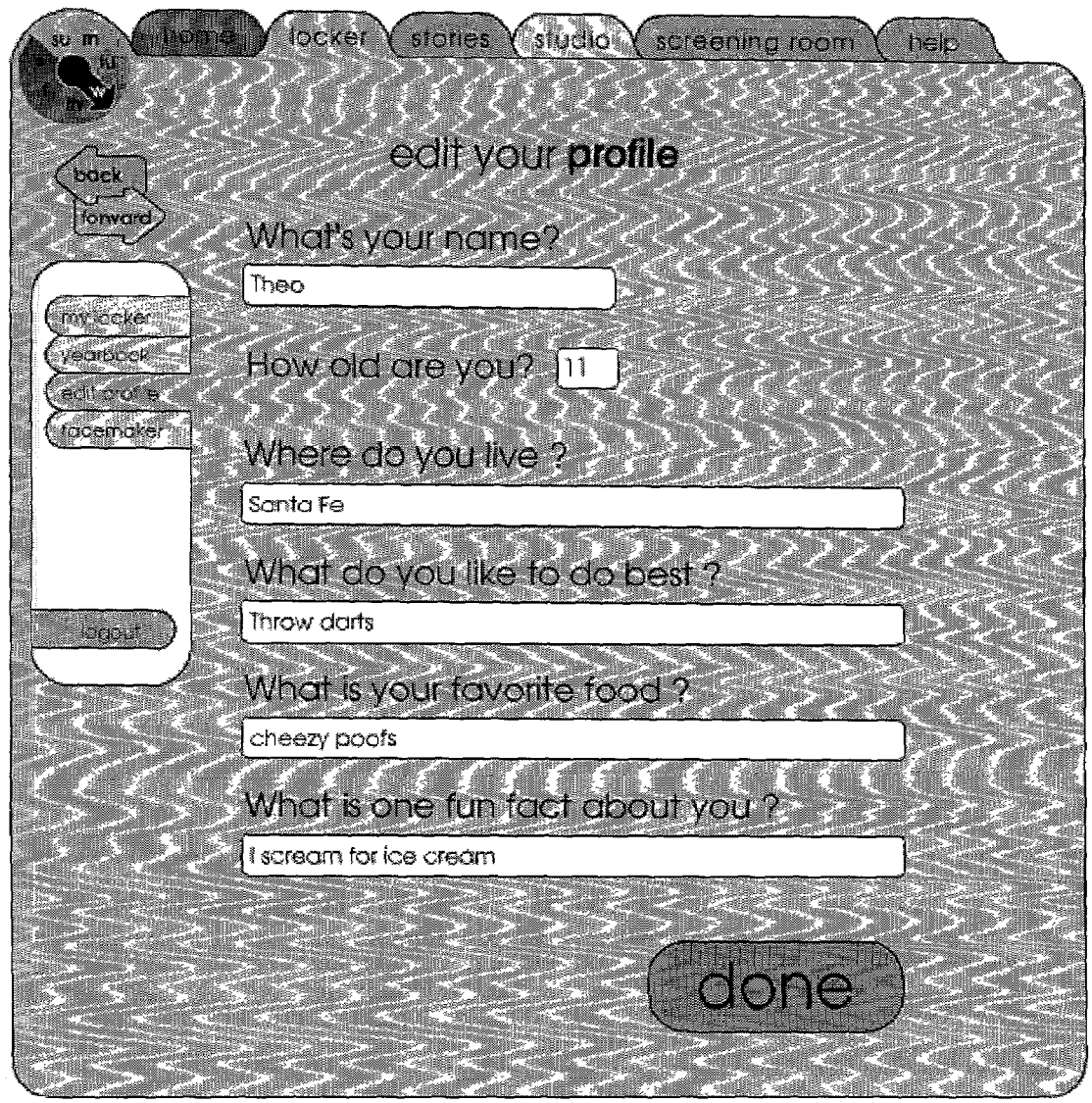
FIG. 2B depicts a screen shot of a page which provides an interface for a user to enter and modify their profile in a collaborative digital media development system website in accordance with one embodiment of the present invention.

The tabs on the left side of the page identify features of the locker. The "edit profile" tab retrieves a page which provides an interface for a user to modify their profile. Such a page is depicted in FIG. 2B. The information in the profile can be used by visitors to find friends and collaborative partners. More importantly, this information can be used to correlate user behavior based on demographics. Thus, for example, one can determine that a certain character of the show is popular with girls age 10–14, based on how often they clicked on that character or used the character in their stories.

Figure 2C:
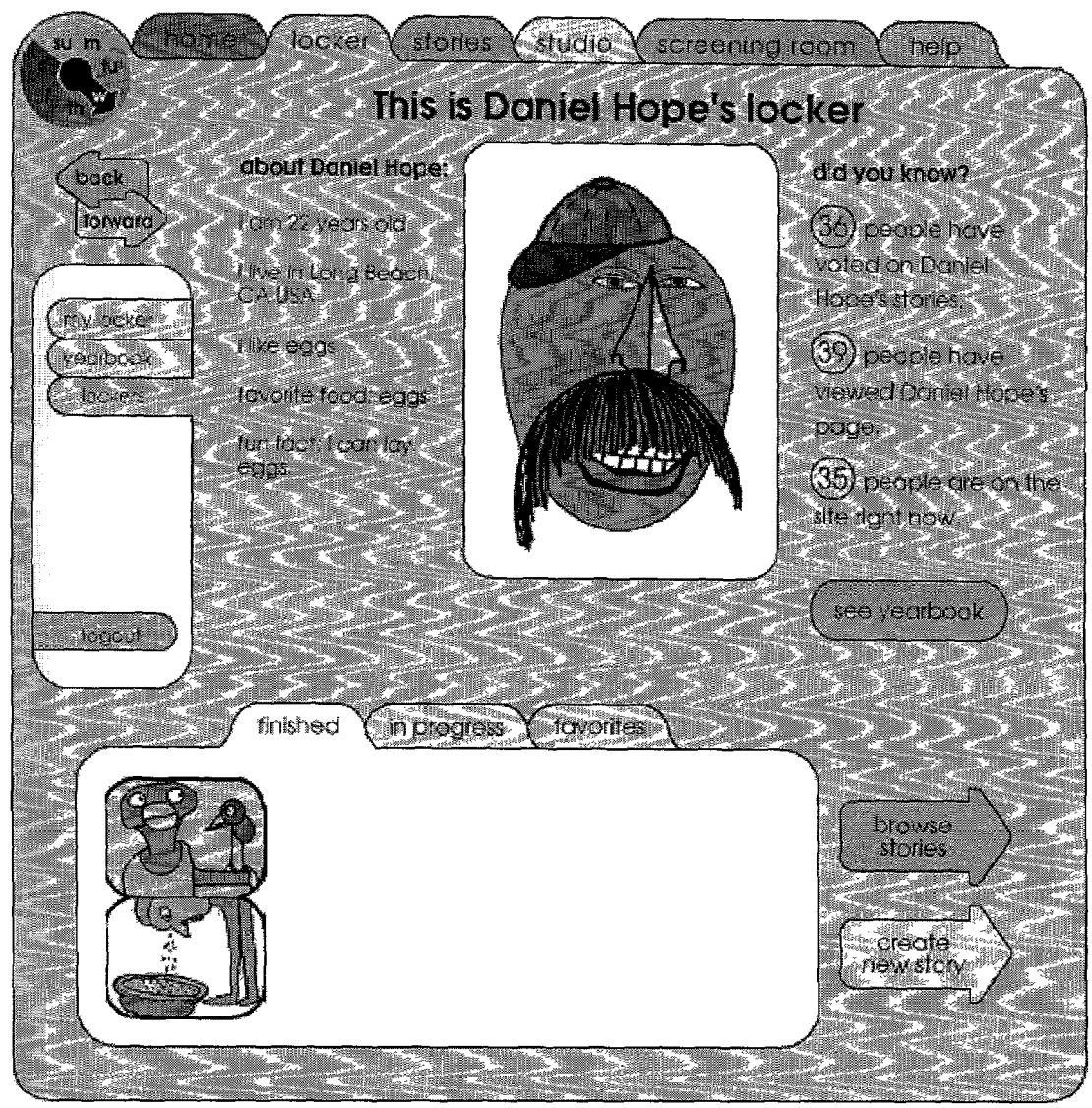
FIG. 2C depicts a screen shot of a page which provides an interface for a user to view the pictures and profiles of other users in a collaborative digital media development system website in accordance with one embodiment of the present invention.

The "lockers" tab retrieves a page which provides an interface for a user to view the pictures and profiles of other users who are members of the community by accessing the public section of their lockers. Such a page is depicted in FIG. 2C. In general, this page will have the same features as described in connection with the main locker page (FIG. 2A), but the information presented will be for another user in the community.

Figure 3:
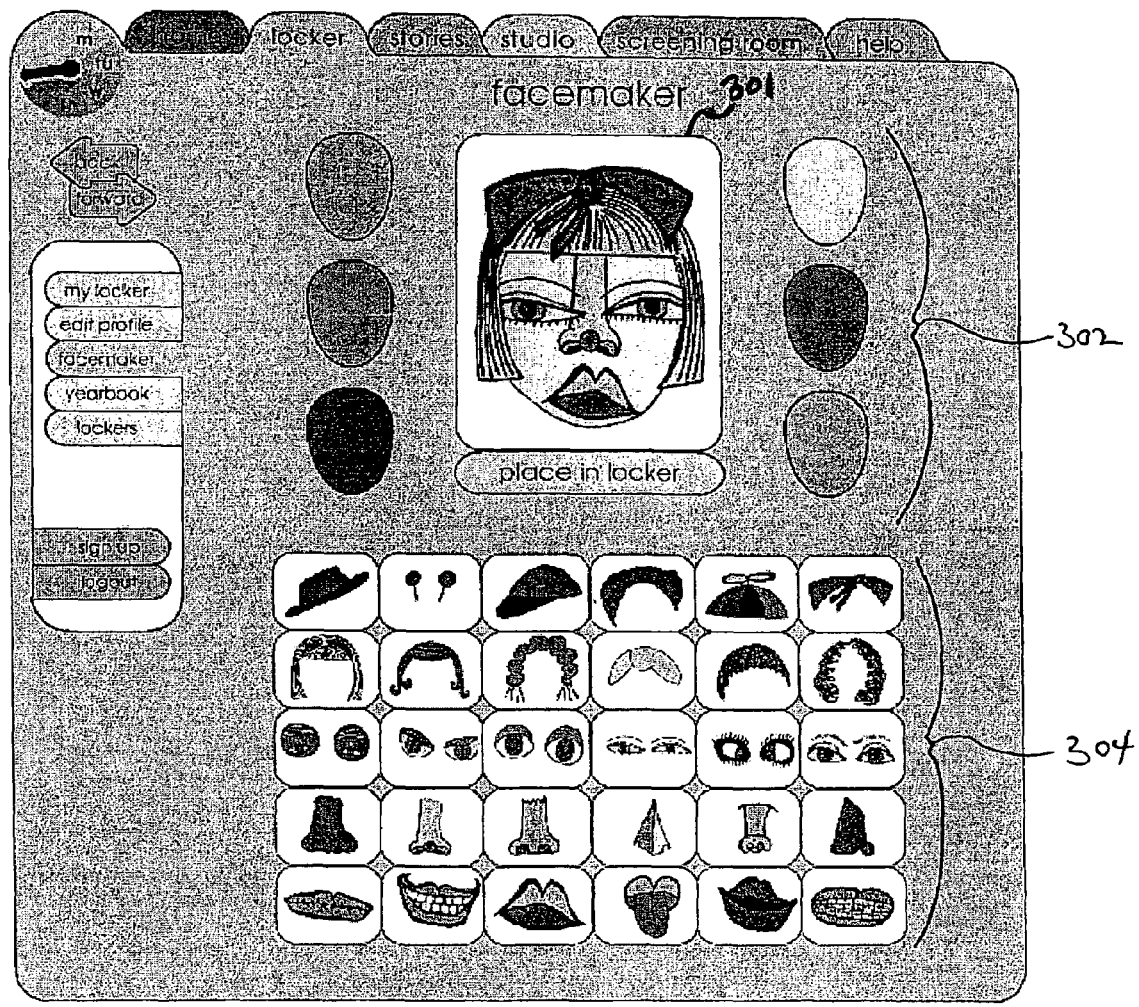
FIG. 3, depicts a screen shot of a "facemaker" page in a collaborative digital media development system website in accordance with one embodiment of the present invention, which is retrieved by selecting the "facemaker" tab or "change picture" button in the main locker page (FIG. 2A).

The "facemaker" tab retrieves a page which provides an interface for a user to modify their personal identity picture, as described in more detail with reference to FIG. 3.

The "yearbook" tab retrieves a page which provides a yearbook, a centralized place to find the identities representing all of the people who are part of the collaborative community, as described in more detail with reference to FIG. 4. The pages accessed by selecting these tabs may also be accessed by selecting the "edit profile," "change picture," and "see yearbook" buttons, respectively, provided in the main viewing area.

Facemaker

As noted above, FIG. 3, depicts the facemaker page (within the locker), which is retrieved by selecting the "facemaker" tab or "change picture" button in the main locker page (FIG. 2A). The facemaker page provides an interface for a user to create or modify their personal identity picture. The facemaker interface is user friendly, for ease of use by children or adults, and allows a user to establish a unique identity for interaction with other members of the community, while protecting their privacy. In this particular embodiment, the identities are created through collaging together simple bits of artwork that are provided to the user.

Many of the site navigation features described above, e.g., the main navigation tabs across the top of the page, also appear in the facemaker page. These features remain accessible to the user while working in any page of the system. A window 301 for the user's profile is provided together with a variety of collage elements that a user may choose, for example in a drag-and-drop manner, to construct an identity picture. In this implementation, the collage elements include a selection of face (skin) colors 302 and facial features and accessories 304 that may be selected and combined according to user preference to create or modify their community identity. The system aims to expose all of the variety and dynamism of a living community via this visual mechanism. The customization of faces allows users to be quickly and uniquely identifiable and to have a sense of their own individuality within the online creative community supported by the system. When the creation is complete, the user can save it by selecting the "place in locker" button.

Yearbook

Figure 4:
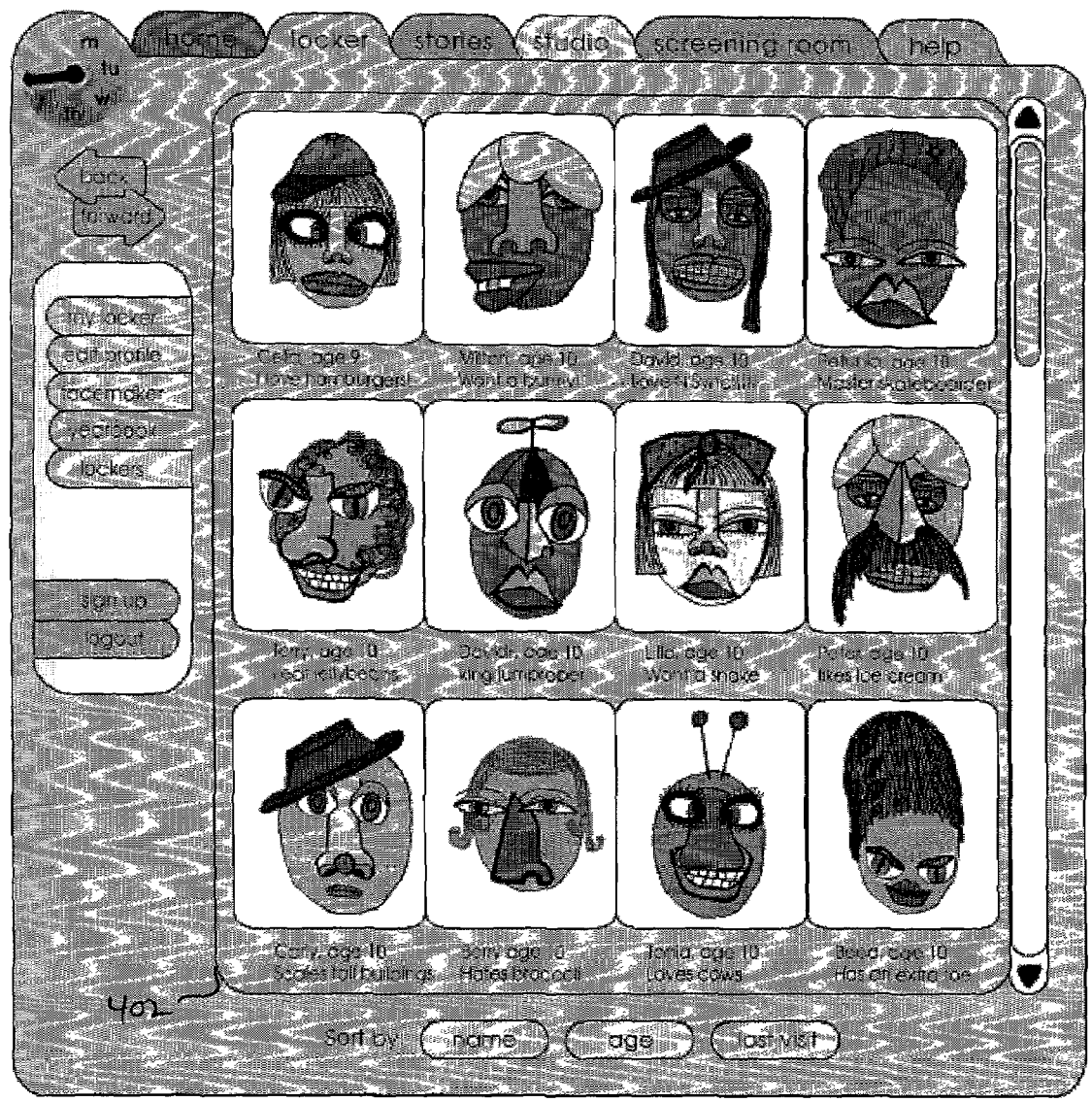
FIG. 4, depicts depicts a screen shot of a "yearbook" page in a collaborative digital media development system website in accordance with one embodiment of the present invention, which is retrieved by selecting the "yearbook" tab in the main locker page (FIG. 2A).

FIG. 4, depicts the yearbook page (within the locker), which is retrieved by selecting "yearbook" tab in the main locker page (FIG. 2A). As noted above, the yearbook page provides a centralized place to find the identities representing all of the people who are part of the collaborative community. The identities are shown as small images, several to a page (in yearbook fashion) and may be scrolled through by using conventional scroll bar controls located beside the main viewing window 402. The identities may be sorted (using conventional techniques) according to various criteria, for example by name, age or time of last visit by selecting appropriate buttons provided for that purpose.

Stories

FIG. 5A depicts the main stories page which may be retrieved by selecting the "browse stories" button in the home or main locker pages or the "stories" tab along the top of any page. The main stories page includes a graphical interface enabling a user to browse through stories created by members of the collaborative creative community supported by the system, for instance, to look for stories that the user is interested in adding to or modifying. An additional stories page provides an graphical interface enabling a user to track a story's history.

In the specific embodiment depicted in FIG. 5A, the main stories page includes many of the basic site navigation features described previously. In addition, the page includes feature specific tabs for retrieving pages associated with the stories feature of the system. The main page is identified by the "browser" tab. A second "genealogy" page may be retrieved by a "who made it" tab.

Browser

The browser is a tool implemented in the main stories page to access the variety of current and popular story submissions within the community supported by the system. Each story is represented by a thumbnail preview frame 502 in the main stories page (FIG. 5A). A user may scroll through the story thumbnail views by using conventional scroll bar controls located beside the a viewing window 504. The story thumbnails may be presented in any number of ways. In this particular embodiment, the story page provides two viewing windows 504, 506 in which the story thumbnails views are presented according to two different sorting parameters. For example, the stories in the upper window 504 are sorted by date (of origination, completion, or most recent contribution, for example), and in the lower window by popularity (a concept which will be described further below in the context of the present application).

The story thumbnail views may be presented to the user via statistical sampling. This is a technique for limiting the amount of information presented to any individual user, and assuring that any individual story will be viewed by a wide array of other users. Statistical sampling controls how many, and which stories are shown as thumbnails in the browser viewing window 504. In general, statistical sampling refers to presenting the user with a random sample of stories whose distribution among the total array of stories follows a given mathematical pattern.

Figure 5B:
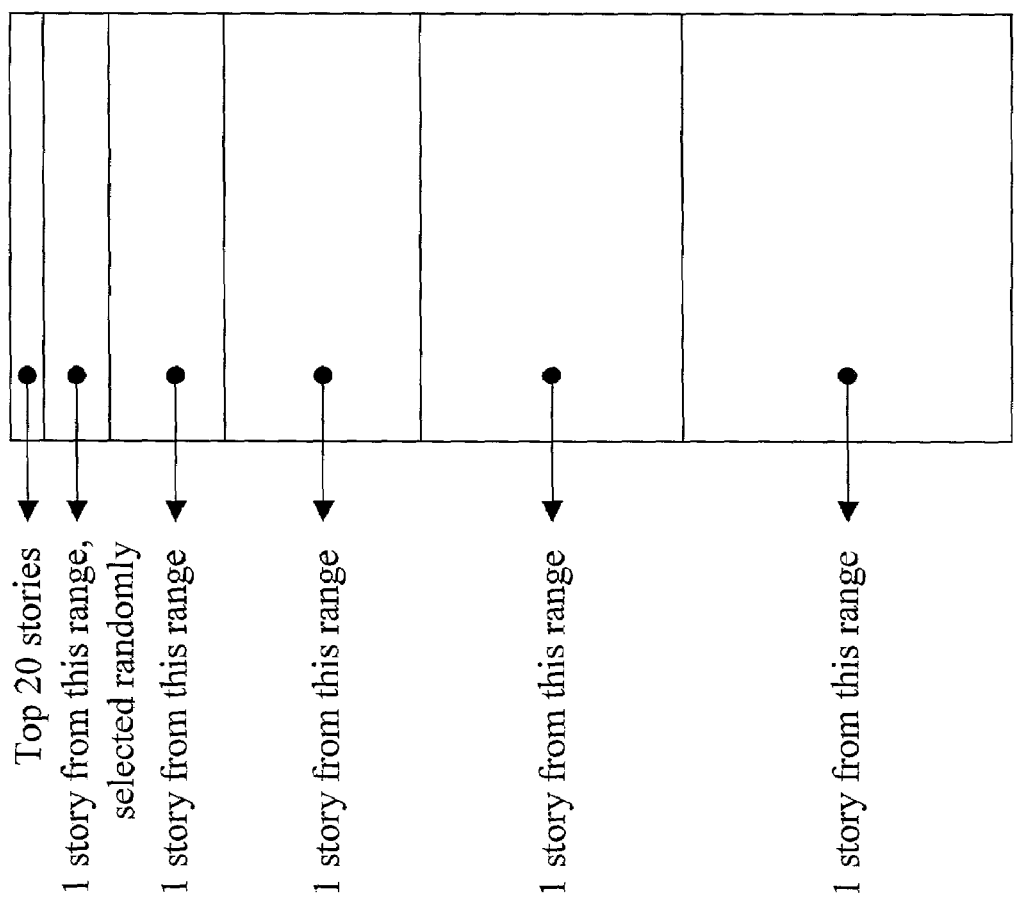
FIG. 5B illustrates a method of statistical sampling in accordance with one embodiment of the present invention.

For example, in one embodiment, statistical sampling may be applied based on popularity. The top (most popular) twenty stories, as determined by explicit and/or explicit voting as described herein, are always shown at the top. Then, additional stories, which are weighted towards higher popularity, are shown so that the viewer gets a sample from each range of popularity. Viewers see stories down to the least popular, however, they see more stories from the higher ranges of popularity. This can be accomplished by dividing the range of stories into successively larger "buckets", described by a popularity range. This popularity interval increases according to an exponential function. An example for selecting twenty-five stories via statistical sampling is illustrated in FIG. 5B. The top twenty (most popular) stories are chosen and then five additional stories are chosen from ranges calculated by an exponential function.

In the main stories page (FIG. 5A), a user may select (e.g., by double clicking on the thumbnail) a story to be viewed in more detail. This selection will retrieve a studio page in the system website, such as that depicted in FIG. 7, to be described in further detail below. Browsing thus facilitates a user's returns to the site to see how well stories are doing relative to each other, and to see what new work has been posted, analogous to an online newsgroup, but with visual material.

Genealogy

Figure 6:
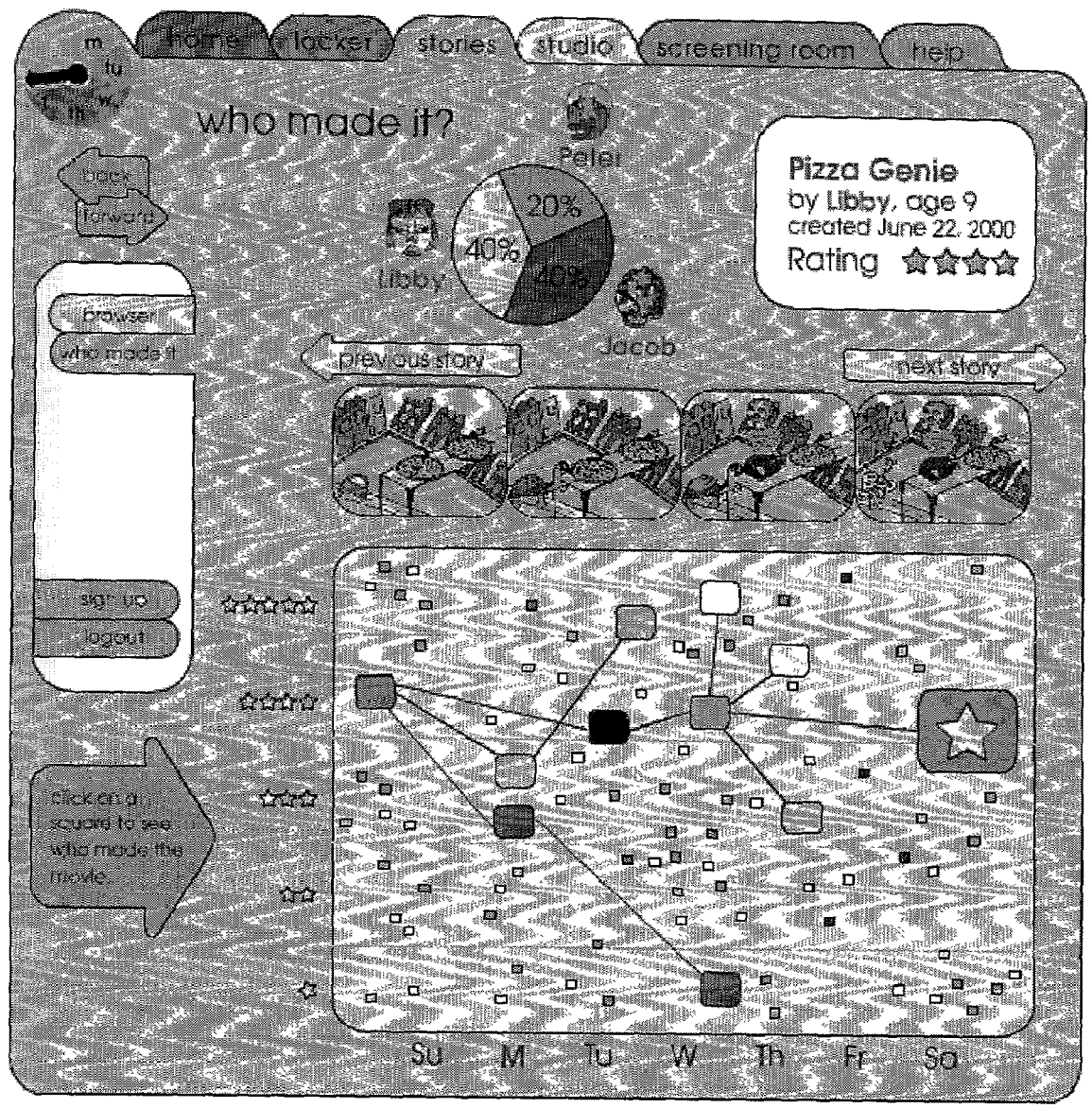
FIG. 6 depicts a screen shot of a genealogy page in a collaborative digital media development system website in accordance with one embodiment of the present invention, which shows the history of and relative contributions to a digital media artifact.

FIG. 6 depicts the genealogy page (within the stories feature) which shows the history of a story. This page may be retrieved by highlighting a story thumbnail in the main stories page (for example by rolling over or clicking on it with a mouse) and then selecting the "who made it" tab. The story history is presented graphically. In the graph, the date of the story contribution is shown in the X-axis, and the popularity in the Y-axis. This presentation provides an excellent illustration of the collaborative creative process that is enabled by systems and methods in accordance with the present invention. The story of interest is identified, in this instance, with a star icon. Stories that were created by modifying each other are shown graphed, so that the closest story to the left, connected by a line, was the one which the user changed to create the given story. In the pie chart, above, the percentage of contribution from each significant author to the selected story of interest is shown. This page give the visitor a strong sense of connection to the other community member users and stories on the site. This visual representation is only one of many possibilities for displaying amount of user contribution and the history of contributions in accordance with the parameters described herein.

The basic user interface aspects of the genealogy feature of the present invention may be implemented according to other programming techniques well known in the art. However, the present invention provides particular beneficial attributes to the genealogy feature. Some examples of genealogy computing algorithms in accordance with a specific embodiment of the present invention is as follows:

Genealogy Algorithms

1. Given a story id: if it has no ancestor, the current author contributed 100%. Otherwise, perform the following steps (2–3).
2. If the story has an ancestor: the author contributed #(elements in author's story frames not in ancestor-author's frames)/#(elements in author's story frames)× 100 to convert to percentage.
3. Of the remaining percentage (call this x), recursively repeat the above algorithm to figure out the ancestor's (author's) contribution. That is, split up x in the same way as above, except now the ancestor's author is the "author", and the ancestor's ancestor is the "ancestor-author." For clarity of presentation, in some implementations, the system can limit the number of authors returned, for example, to 4, and return the remaining percentage as "other."
4. Always order the authors like this: current, [parent,] [grand-parent,] [great-grandparent,] [other].

Alternatively, the algorithm in section 2 may be replaced with one of several alternate algorithms. Two examples are:

2a. Geometrically compute the difference in position, orientation and scale between all identical elements in each frame using a technique such as algebraic invariants, assigning a zero score for elements that do not correspond between frames.
2b. Create bitmap images of each frame and perform an image-based comparison (such as a pixel subtraction), then sum the difference across pixels and divide by the total number of pixels for a difference metric.

Studio

The studio is the core interactive area of the system website. With the studio interface provided by this embodiment of the invention, users can create collages in a game-like environment. These collages are story fragments and suggestions that users submit to the community to be voted upon. Users can create their own stories from scratch, or modify stories contributed by other members of the community supported by the system.

Viewer

FIG. 7 depicts the story viewer page (within the studio feature) which allows a user to view a selected story—by selecting in the browser (main stories page), for example—in detail. This page may be retrieved by selecting a story thumbnail in the main stories (browser) page or by selecting the "viewer" tab in the main studio page, described below in conjunction with FIG. 8. From within the viewer, a user can view and read through the frames of the story. As shown in FIG. 7, the story may be depicted in thumbnail-size frames 702 which may be individually enlarged for viewing. Caption text associated with a story frame is also presented in the enlarged frame view 704.

Buttons are provided for additional interaction in connection with the selected story:

To share the story with a friend, the user can select the "email to a friend" button which will sends a link to the site to an email address input by the user, which, when clicked on, brings up this story. This feature provides a mechanism for attracting new users to the community supported by the system via viral marketing.

A "vote" button and an icon are also provided to enable the user to cast a vote for the story. Selecting the "vote" button or icon will retrieve an interface that will allow the user to indicate their opinion of a particular story. In one embodiment, the vote is cast by way of a rating, for example, a 5-star rating system, such as depicted in the genealogy page (FIG. 6). In this way a user can expressly vote for a particular story.

It important to note that the system may also be configured to take into account user conduct that may be considered implicit voting. For example, a user's decision to read and/or modify and thereby contribute to the story of another member of the community suggests that the user considers the story to have merit or at least interest. This implicit voting may be tracked by gathering such statistics. The cumulative attention given to a particular story in the system in this way is an indication of the "popularity" of the story, even in the absence of explicit voting on the story. Implicit voting may be even be quantified and reported to other users. Individuals' behavior can also be tracked to deliver valuable demographic information to the client customer. For example, by tracking the frequency of use for particular story assets, we can determine that a given character, object or product is popular within a given demographic range (such as boys, aged 18–24).

A "make changes" button is provided to enable the user to modify the story. Selecting the "make changes" button will retrieve an interface that will allow the user to modify the selected story. In one embodiment, this feature invokes the creation of a copy of the story that the user can then modify. The back-end of the system keeps track of what and how much has been changed from the original story selected for modification, and this information may made available to community members in the genealogy page (FIG. 6), as described above. This process is akin to that of source control in software engineering. The entire history of who made what change when is tracked by the system. The "make changes" button retrieves the studio's editor page, described below.

Editor

FIG. 8 depicts the editor page (within the studio feature), which allows a user to create or modify a selected story. This page may be retrieved by selecting a story thumbnail in the main stories (browser) page or by selecting the "editor" tab in the story viewer page, described above in conjunction with FIG. 7. This page may also be accessed by selecting the "studio" tab along the top of any other page on the site. The editor page provides a graphical interface enabling a user to create new stories, or to modify stories created by members of the collaborative creative community supported by the system, using elements from a database.

As noted above, in the editor page, a user may create a new story from scratch, or may modify an existing story. The stories are similar to newspaper comics—a series of static frames that tell a simple story or joke. The mechanics of either process are similar. Referring to FIG. 8, a user is provided with a series of frames 802 that contain or will contain the story. In this instance, the story is constructed using a graphical collage-based technique. A user may select a frame to work on, for example, by clicking on it with a mouse. The selected frame will then appear in enlarged form is the main window 804 in the page.

Below the main window 804 is a text entry field 806 in which a user may enter caption text for a collage frame by selecting the field 806 and typing in the text on the keyboard of a computer on which a client of the system is running. Text entry field 806 may also take the form of word bubbles to indicate dialogue spoken from one character to another, as are commonly found in comic books.

Below the text entry field are presented thumbnail views of various elements of an image that can be assembled in the window 804 in an electronic collage manner. For example, in this instance the elements include body parts 808, backgrounds 810, and objects 812. A user may scroll through the elements available and select an element by clicking on it to have it appear in the main window 804. Other elements may be added to the window 804 in the same way. The elements may then be moved in the main window 804 in a drop-and-drag manner to create a collage composition for the frame. In an alternative embodiment, the elements may be presented in a separate page as a browsable and sortable collection of graphic materials (characters, backgrounds, props, etc.) that a user can select from to add to his or her private collection (e.g., in the user's studio editor page). Another embodiment allows users to submit their own characters, photographs, or artwork, to be incorporated into stories. This artwork is processed either automatically or manually and turned into the appropriate manipulable format, such as Flash vector files.

Once the user has finished working on a frame, a new frame may be selected and worked-on in the same manner. Buttons are provided to save a story when the user has finished it, or finished working on it for the time-being, or to clear a frame that the user wishes to discard.

Screening Room

Figure 9:
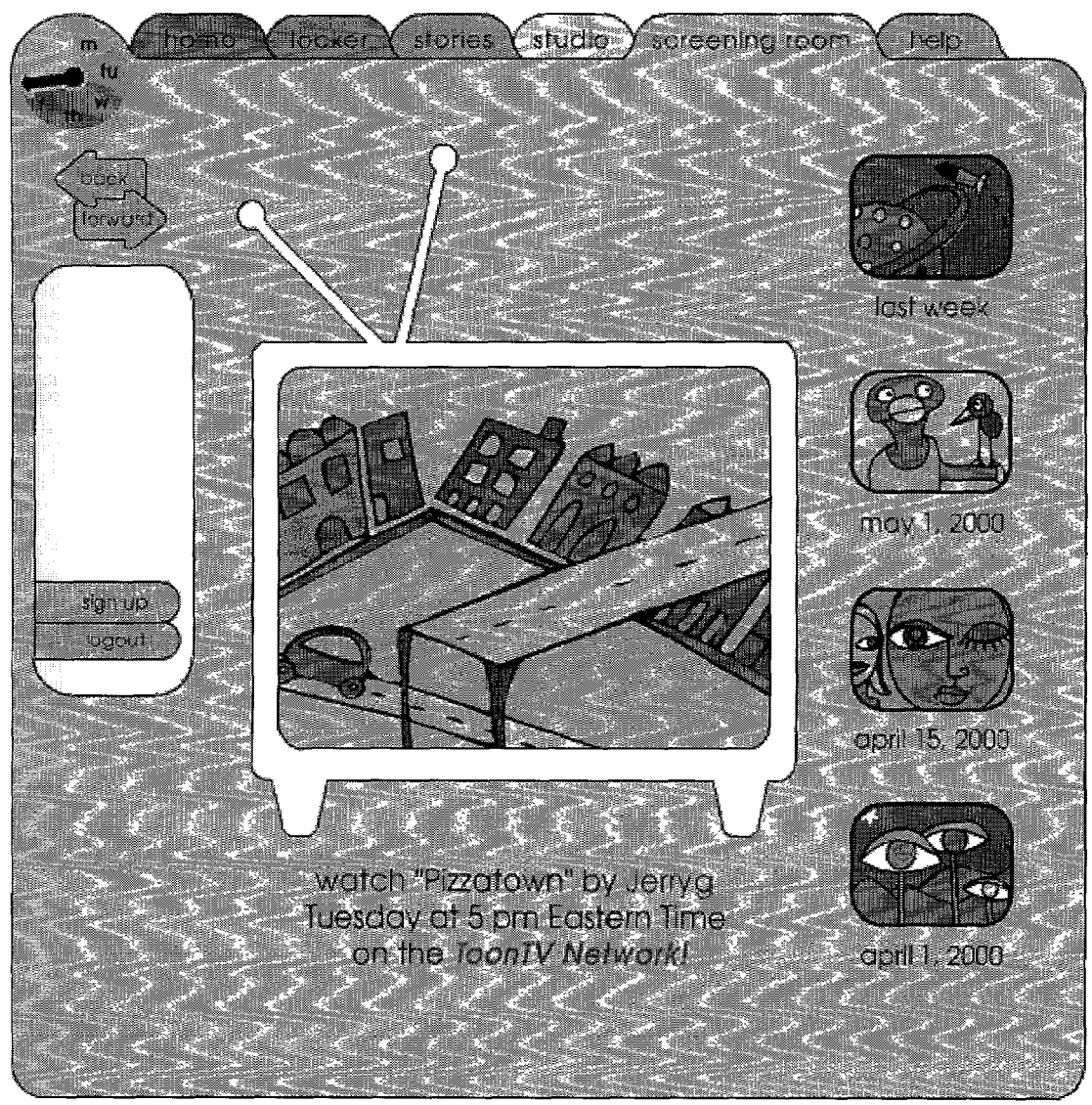
FIG. 9 depicts a screen shot of a screening room page in a collaborative digital media development system website in accordance with one embodiment of the present invention, available to display a preview for a final media production.

The screening room page of FIG. 9 is retrieved by selecting the "screening room" tab on any page of the system website. This page is available to display a preview for the final production. In this embodiment, at the end of the community's deadline, producers wholly or partially from within or without the collaborative community, for example professional media creators (animators, writers, directors, musicians, etc.), may use the community's contributions to construct a professional media product, for example, a short animation or film. The final product from these collaborative media development projects may be presented online or aired on offline media (i.e., television). This page directs users to where the product can be viewed. For example, on Tuesday at 5:00 Eastern Time on the Toon TV Network.

Prior productions can also be seen here, rebroadcast back to the web. Such prior productions may be viewed by selecting the appropriate thumbnail frame displayed in the screening room page.

Alternative Embodiments

It should be recalled that the deadline-driven collaborative creation environment described above is only one embodiment of the present invention. Alternatively, producers may produce a final product from the community's collaborative contributions independent of a deadline. Or, an individual user may select and combine a subset of the collaborative contributions to the media artifact into a final media product.

Of course, the graphical interface features of systems and methods in accordance with the present invention may be implemented in a myriad different ways. A specific embodiment of the invention has been described above for purposes of illustration. Many alternative implementations are possible within the parameters of the present invention described above and claimed herein. Some alternative embodiments of features of the invention are described below.

Character Studio

Figure 10:
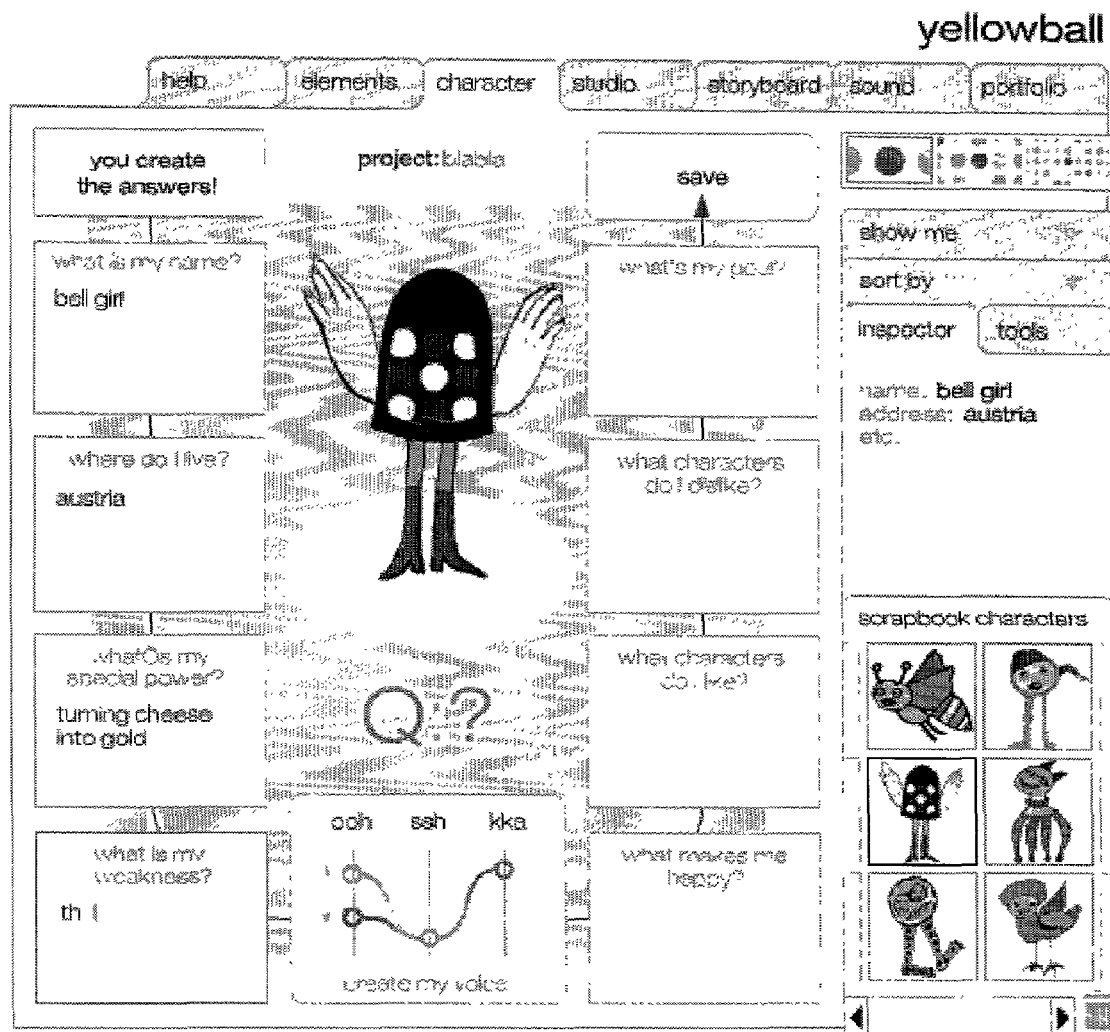
FIGS. 10 and 11 depict screen shots of alternative implementations of features in a collaborative digital media development system website in accordance with embodiments of the present invention.

FIG. 10 depicts a "character studio page," which may be a page in the same system website as described above. The character studio provides an interface supporting a structured exercise for creating a character's personality. A user answers a series of questions, which are then forwarded to the community or voting (explicit and implicit via statistics gathering), sorting and further use.

Soundtrack Studio

Figure 11:
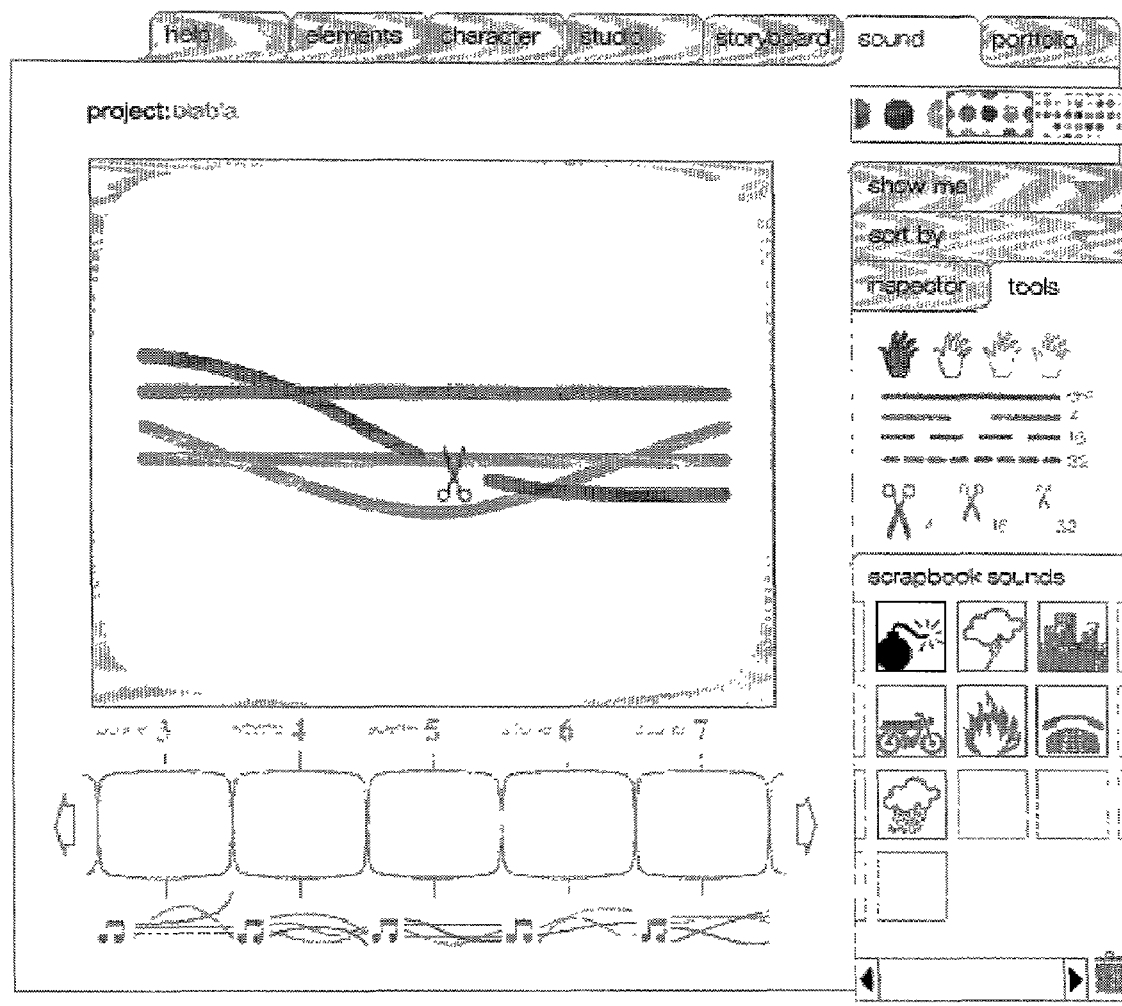

As noted above, the collaborative media creation tools of the present invention are not limited to visual media creations. FIG. 11 depicts a "soundtrack studio" page. The soundtrack studio allows the creation of small musical bits in a similar manner to that described above in relation to animation. The interface provides a game-like sonic environment which enables the production of an original synthesized piece of sound.

The soundtrack studio allows the user to create short pieces of soundtrack to accompany storyboard frames, objects and characters. The user is encouraged to manipulate illustrated parameters in order to explore musical/auditory ideas. A user may store and select elements of a sonic composition from among scrapbook sounds identified by icons on the page. The soundtrack studio page has an intuitive graphic interface that requires no prior understanding of traditional music notation or theory by the user.

In order to deliver high quality audio over the internet, sound may be created via synthesis, sampling and timbral changes, rather than solely by mixing pre-recorded elements. Sounds may be saved as pre-configurations that load to model. Alternatively, sounds may be synthesized in real-time with the use of a simple DSP plug-in that produces less realistic sounds, but offers computation and memory dividends.

In one embodiment, professional musicians use the short melodic ideas, moods and sound effects suggested by users in the soundtrack studio to compose professional music. Sounds can be created for a stand-alone music community and forwarded to a community to determine their popularity. The most popular may be used by a professional sound designer or musician in creating the soundtrack to a film, animation, or creating a song.

Non-Electronic Media Products

The final media product of the present invention will often be a digital or other intangible electronic creation. It should be understood that the present invention may be applied to the collaborative creation of a tangible item. For example, members of a creative community could collaboratively create a digital media artifact in accordance with the present invention, such as a comic strip. The digital artifact could be converted to a final media product rendered in print media. An example of this is a special edition product, such as product packaging (e.g., a cereal box or soda can) featuring the media product resulting form the collaboratively created digital media artifact.

System Implementation

The following description provides implementation details sufficient to enable one of skill in the art to practice the present invention. Those of skill in the art will realize that systems in accordance with the present invention may be implemented in other ways using suitable hardware and software tools, and one of skill in the art will recognize that the system may be implemented using other architectures effective for accomplishing the features and operation of the system as described herein.

System Architecture

Figure 12:
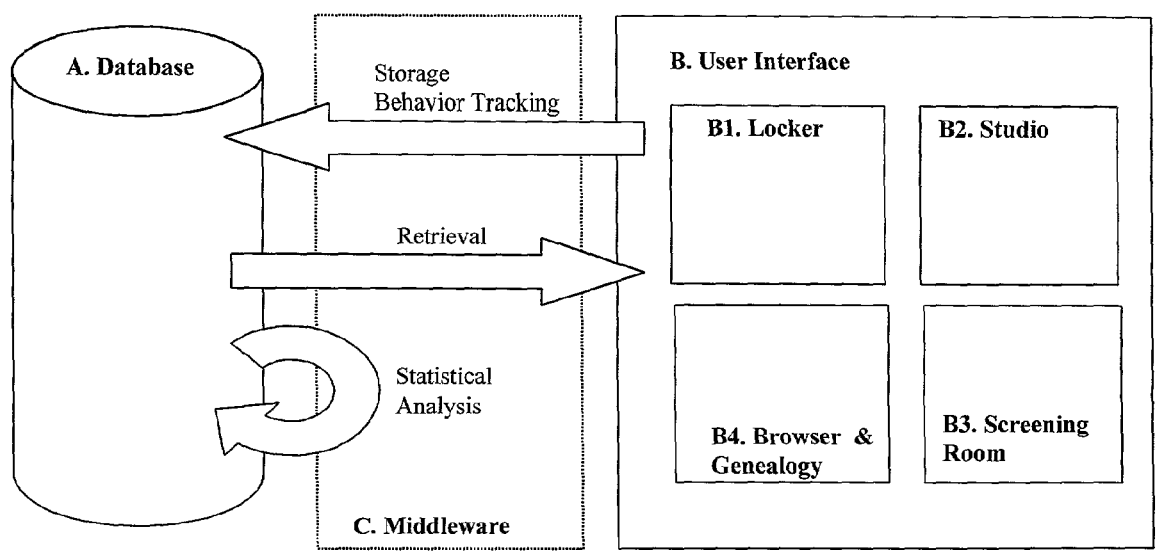
FIG. 12 illustrates an architecture suitable for implementing a collaborative digital media creation system in accordance with the present invention.

FIG. 12 illustrates an architecture suitable for implementing a collaborative digital media creation system in accordance with the present invention. The system includes at the back end (server-side) a database infrastructure (A) for media storage, annotation, retrieval, authorship tracking, popularity tracking, statistics gathering, etc. At the front end (client-side), the system includes a simple template-based user interface (B) with a "locker" for maintenance of personal identity information (B1), "studio" for creation of stories and tracking of user behavior (B2), a screening room for the delivery of finished media and tie-ins to traditional media broadcast (B3), browser for viewing the communities' work, voting and gathering passive statistics on popularity (B4). The system further includes API and middleware (java servlets) for communicating between the client and back-end, including templatized delivery of information via XML. One method for delivering information is to use HTTP and/or sockets for communication from the client to the server and use XML for communicating back from the server to the client.

In a preferred embodiment, the system is deployed using an Application Service Provider (ASP) model. The system operator provides the hosting for both the front-end and back-end components. However, these components appear seamlessly integrated into the customer's website. The client-side of the system is implemented using industry-standard Macromedia Flash™, which is currently deployed on over 90% of browsers worldwide. Flash™ provides the ability to deploy high quality artwork and interactive, scalable graphics to fit a wide range of browsers. The back-end includes scalable middleware (WebLogic, EJB and custom Java servlets) with an Oracle Database.

In a specific embodiment, the system is optimized for 56K modem users. Flash provides much of the infrastructure for delivering high-quality graphics with low bandwidth. Additionally, the system is broken into a light, fast-loading shell application, with other sub-components loaded separately. Artwork, stories, faces, etc., are also loaded piecemeal to assure quick response for all user actions. The application is roughly 100–200K and each element is 1–5K. All loaded components are locally cached in the browser, for fast retrieval after the initial load.

The system is implemented via a digital device network which may encompass any of a variety of networking modes and devices, including, without limitation, personal computers, wireless devices, cable boxes, modems, cable modems, cellular telephones, personal digital assistants (PDAs), and other types of interactive computing and television hardware and software, as are well known in the art.

EXAMPLES

The following examples describe scenarios illustrating aspects and features of specific implementations in accordance with the present invention. It should be understood the following is representative only, and that the invention is not limited by the detail set forth in these examples.

Example 1

Deadline-Driven Collaborative Community

A deadline-driven community working to contribute ideas for an animation, television program, song or other media product which is then professionally produced from the most popular community submissions.

For example, a community of individuals formed by the participation of its individual members could collaboratively develop an animation, television program, song or other media product online by adopting, rejecting or and/or adapting the various contributions (generally just fragments, rather than big components of a project or a completed project) of the members of the collaborative community. The adoption, rejection, etc., of various contributions of community members by the community as a whole represents a form of implicit voting. The contributions of the individuals participating in the collaboration are tracked, both for purposes of attribution, and so that an overall "quality" rating may be applied and tracked for the total contributions of a particular individual community member based on the implicit voting scheme (an explicit voting scheme could also be used). At the deadline, the narrative and story fragments with the most popularity are submitted to a professional production team to be shaped into a coherent narrative final product which is produced as an animation, television program, song or other media product. At the deadline, the community's collaborative creation is submitted for professional production to create a final product. Other projects could be conducted by communities having the same, entirely different, or overlapping composition of individual members relative to this community.

Example 2

Fixed-Asset Collaborative Community

A community such as described in Example 1, but where the assets in the database are fixed, typically coming from an established live action or animated media program. The community then engages in this deadline-driven structured process to create or contribute ideas to original episodes of this series. In the case of a live action series, elements in the database are akin to paper dolls featuring images or caricatures of characters and props from the television show. With the mechanisms of the present invention, the community can submit new plot ideas and situations.

Example 3

Brokered "Free-For-All" Community

A brokered "free-for-all" community, where there are no professional producers, but rather deadline-driven "auctions" where people try to attract talent to execute a project developed in the collaborative media framework, creating media such as animation, video, music, etc. using the structured framework of the system and methods of the present invention.

CONCLUSION

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A computer-implemented method of developing digital media content, comprising:
   (a) providing a user interface to a digital device network, said interface configured to enable a user to contribute collaboratively online with other users in a collaborative community to modify a digital media artifact, wherein the digital media artifact comprises a story and wherein a plurality of competing derivative digital media artifacts are created by integrating one or more user contributions with the digital media artifact;
   (b) creating a visual indicator to identify the user to other users in the collaborative community wherein the visual indicator protects the privacy of the user;
   (c) establishing a deadline for user contributions to the online digital media artifact;
   (d) determining a plurality of popularities of the plurality of derivative digital media artifacts derived from the digital media artifact;
   (e) submitting a selected popular derivative digital media artifact received prior to the deadline for production by a third party into a final media product; and
   (f) tracking a genealogy of the digital media artifact including a history of the digital media artifact and collaborative user contributions, wherein a percentage contribution by each users is calculated based at least in part on the number of story elements of the digital media artifact contributed by each user.

2. The method of claim 1, wherein said third party is part of the collaborative community that participated in the creation of the digital media artifact.

3. The method of claim 1, wherein said third party is not part of the collaborative community that participated in the creation of the digital media artifact.

4. The method of claim 1, wherein popularity is determined by explicit or implicit voting by community members.

5. The method of claim 1, wherein popularity of a user contribution to the collaborative media artifact is determined implicitly by tracking viewing and/or use of the contribution by other users in the collaborative community.

6. The method of claim 1, wherein popularity of a user contribution to the collaborative media artifact is determined explicitly by tracking the assignment of a quality rating to the contribution by other users in the collaborative community.

7. The method of claim 1, wherein the media product is one or more of an animation, television program, song, motion picture or commercial.

8. The method of claim 1, wherein the media product is a special edition product.

9. The method of claim 1, wherein the user contributions include one or more of plots, characters, settings, situation, sound clips, drawings, artwork, and video clips.

10. The method of claim 1, wherein the user contributions are based on materials from a fixed-asset database.

11. The method of claim 1, wherein the user contributions include contributions to a working material asset database available to other members of the community.

12. The method of claim 1, wherein user contributions to a collaborative digital media artifact are tracked based on a genealogy algorithm.

13. The method of claim 12, wherein modification history and percentage of contribution from multiple parties to the collaborative digital media artifact is graphically displayed.

14. The method of claim 1, wherein the users in the online collaborative community provide identity information in a user profile viewable by other members of the community.

15. The method of claim 14, wherein user activity in the online collaborative community is tracked.

16. The method of claim 15, wherein user activity is correlated with user profile data to determine demographic preferences.

17. The method of claim 1, further comprising providing an interface to a digital device network, said interface configured to enable a user to view a plurality of digital media artifacts collaboratively created by members of the online collaborative community, and to select from among the plurality of artifacts, one or more artifacts to modify.

18. The method of claim 17, wherein the interface configured to enable a user to view a plurality of digital media artifacts collaboratively created by members of the online collaborative community uses statistical sampling to select the plurality of artifacts presented to the user from among a larger plurality of digital media artifacts collaboratively created by members of the online collaborative community.

19. The method of claim 1, further comprising combining a plurality of popular derivative digital media artifacts to create the selected popular derivative digital media artifact.

20. A computer-supported system for developing digital media content, said system comprising:
   (a) a network of digital devices configured to run software providing a user interface to the digital computer network, said interface configured to enable a user to contribute collaboratively online with other users to modify a digital media artifact, wherein the digital media artifact comprises a story and wherein a plurality of competing derivative digital media artifacts are created by integrating one or more user contributions with the digital media artifact, and wherein a visual indicator is created to identify the user to other users in the collaboration community wherein the visual indicator protects the privacy of the user; and
   (b) a media production capability;
   wherein said system is operated to determine a plurality of popularities of the plurality of derivative digital media artifacts derived from the digital media artifact; to submit a selected popular derivative digital media artifact prior to an established deadline for production into a final media product; and to track a genealogy of the digital media artifact including a history of the digital media artifact and collaborative user contributions, wherein a percentage contribution by each users is calculated based at least in part on the number of story elements of the digital media artifact contributed by each user.

21. The system of claim 20, wherein said network of digital devices comprises:
   one or more clients running front-end software, said software providing a user interface to the digital computer network, said interface configured to enable a user to contribute collaboratively online with other users to modify a digital media artifact wherein a plurality of competing derivative digital media artifacts are created by integrating one or more user contributions with the digital media artifact;

one or more servers running back-end software, said software configured to interface with the front-end software to coordinate the contributions of a plurality of users;

one or more databases configured for storage of digital media and associated information; and application program interfaces (APIs) and middleware (server-side software components) configured to communicate between the one or more clients, servers and databases.

22. The system of claim 20, wherein said digital device network comprises one or more of personal computers, interactive television devices, cable boxes, and cable modems.

23. The system of claim 22, wherein said digital device network further comprises one or more of wireless devices, cellular telephones and personal digital assistants.

24. A computer program product comprising a computer-usable medium having computer-readable program code embodied thereon relating to providing a computer-supported system for developing digital media content, the computer-readable program code effecting the following step within a computing system:

(a) providing a user interface to a digital device network, said interface configured to enable a user to contribute collaboratively online with other users to modify a digital media artifact, wherein the digital media artifact comprises a story and wherein a plurality of competing derivative digital media artifacts are created by integrating one or more user contributions with the digital media artifact;

(b) creating a visual indicator to identify the user to other users in the collaborative community wherein the visual indicator protects the privacy of the user;

(c) establishing a deadline for user contributions to the online digital media artifact;

(d) determining a plurality of popularities of the plurality of derivative digital media artifacts derived from the digital media artifact;

(e) submitting a selected popular derivative digital media artifact received prior to the deadline for production into a final media product; and (f) tracking a genealogy of the digital media artifact including a history of the digital media artifact and collaborative user contributions, wherein a percentage contribution by each users is calculated based at least in part on the number of story elements of the digital media artifact contributed by each user.

* * * * *